(12) United States Patent
Kitamura et al.

(10) Patent No.: US 7,144,643 B2
(45) Date of Patent: *Dec. 5, 2006

(54) MAGNETIC RECORDING MEDIUM

(75) Inventors: Kenichi Kitamura, Tokyo (JP); Hiroyuki Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 10/425,659

(22) Filed: Apr. 30, 2003

(65) Prior Publication Data

US 2004/0018388 A1    Jan. 29, 2004

(30) Foreign Application Priority Data

Apr. 30, 2002    (JP) .............................. 2002-127879

(51) Int. Cl.
G11B 5/706 (2006.01)
B05D 5/12 (2006.01)

(52) U.S. Cl. .............................. 428/844.4; 428/844.5; 428/845.5; 427/127

(58) Field of Classification Search ................ 428/611, 428/687, 65.3, 65.4, 65.6, 328, 694 TR, 694 B, 428/694 BP, 212, 694 BN, 694 BR, 695, 428/329, 844.4, 844.5, 845.5, 840.2, 842.8; 324/210, 211, 212; 369/13.27; 427/127
See application file for complete search history.

(56) References Cited

U.S. PATENT DOCUMENTS

| 5,712,028 | A | * | 1/1998 | Seki et al. ............ 428/694 BS |
| 6,338,896 | B1 | * | 1/2002 | Meguro et al. ........ 428/694 BS |
| 6,686,022 | B1 | * | 2/2004 | Takano et al. ........... 428/842.8 |
| 6,777,061 | B1 | * | 8/2004 | Kitamura et al. ......... 428/840.2 |
| 2001/0028963 | A1 | * | 10/2001 | Naoe et al. ............ 428/694 BN |
| 2002/0106497 | A1 | * | 8/2002 | Ishiguro et al. ............. 428/212 |

FOREIGN PATENT DOCUMENTS

JP    11-086265    3/1999

OTHER PUBLICATIONS

Translation of JA 11-086265.*

* cited by examiner

Primary Examiner—Carol Chaney
Assistant Examiner—Louis de Falasco
(74) Attorney, Agent, or Firm—Oblon, Spivak, McClelland, Maier & Neustadt, P.C.

(57) ABSTRACT

The invention provides a high performance magnetic recording medium used in the magnetic recording system using the MR head for the regeneration head, wherein the magnetic recording medium does not damage the MR head by direct sliding contact while having durability and self-cleaning power enough for preventing abrasion of the magnetic recording medium itself.

6 Claims, 2 Drawing Sheets

MAGNETIC RECORDING MEDIUM

BACKGROUND OF THE INVENTION

1. Field of the Invention

The invention relates to a magnetic recording medium, particularly to a magnetic recording medium that can be favorably used in a magnetic recording system using an MR head as a reproduction head.

2. Description of the Related Art

Use of an inductive MR composite thin film head using an MR head as a reproductive head has been proposed in compliance with recent requirements of high density recording for magnetic recording media, The MR head is a reproduction head for sensing data by taking advantage of an MR (magnetoresistive) effect. Since this head has higher sensitivity than conventional heads and reproduction output thereof can be largely improved, a high density recording is possible in a magnetic recording system using the MR head as described above even in a magnetic recording medium having a small leak magnetic flux ascribed to a short recording wavelength.

However, since the MR element part of the MR head comprises a laminated thin layer, the MR head is liable to be damaged by direct sliding contact with a tape as well as by generation of smearing and electrostatic discharge (ESD) as compared with the inductive head. "Smearing" as used herein refers to as a phenomenon by which a metal surrounding the MR element is elongated in the sliding direction due to ductility of the metal to cover the MR element, and "ESD damage" refers to as a phenomenon by which the MR head is deteriorated or the MR head and peripheral portion thereof are melted by a heat generated by electrostatic discharge. When the head is damaged by these phenomenon and generation of flaws, the output of the MR element becomes unstable due to resistance changes of the MR head or the head does not substantially function, causing system faults in both cases.

For enabling a long term use of the MR head, the length of the MR head in the direction of depth has been increased in order to enable the function of the head to be maintained even when the head suffers a certain extent of abrasion. However, since sensitivity of the MR element decreases by the countermeasures as described above, it is a problem that the MR head is forced to be used with a low reproduction output.

Accordingly, in a desirable technology, defective output and defective reading ascribed to the damages of the head after a long term of use may be prevented from occurring by reducing the degree of abrasion caused by sliding while maintaining high sensitivity of the MR head by improving the magnetic tape side instead of improving the MR head side. Sensitivity of the MR head would be enhanced by reducing the length of the MR head in the direction of depth with no changes of the output resistance by abrasion provided that the MR head is not worn by sliding contact of the tape. Such technology is considered to be applicable for improved high density recording.

SUMMARY OF THE INVENTION

Accordingly, the object of the invention is to provide a high performance magnetic recording medium to be used in a magnetic recording system using an MR head as a regeneration head, wherein the MR head is not damaged by a direct sliding contact with the magnetic recording medium, and the magnetic recording medium itself has an excellent durability.

The magnetic recording medium of the invention becomes to have sufficient durability without giving no damages to the MR head and with little adhesion on the head, by adjusting grinding ability of the magnetic tape as the recording medium in a specified range that does not affect the strength and self-cleaning power of the tape.

The invention for solving the problems above provides a magnetic recording medium used for a magnetic recording system having an MR head as a regeneration head, and the recording medium comprises at least a nonmagnetic layer and magnetic layer sequentially laminated on one face of a nonmagnetic supporting member. The magnetic recording medium is supported with a tension of $8.8 \times 10^{-1}$ N/cm per unit width between two guide rolls disposed with a center-to-center distance of 45 mm, and an edge in the longitudinal direction of a rectangular column of a sendust bar having a square cross section pushes the magnetic layer forming face of the magnetic recording medium at the middle point between the guide rolls in the direction perpendicular to the running direction of the magnetic recording medium with a displacement of 2 mm. The width of the face at the edge of the sendust bar formed by abrasion of the sendust bar in the running direction of the recording medium is 9 to 25 µm after 200 times of reciprocating movement at a running speed of 2.5 m/s with a total running length of the magnetic recording medium of 250 m.

Preferably, the amount of extracted fatty acids in cyclohexane when the magnetic recording medium is immersed in cyclohexane for 2 minutes is 0.1 to 4.0 mg/m² of the surface area of the magnetic layer.

For manufacturing the magnetic recording medium having grinding ability as described above, the magnetic layer is formed by coating a magnetic paint comprising at least a ferromagnetic powder, a binder resin and an abrasive on the nonmagnetic supporting member as solid fractions. The step for producing the magnetic paint comprises adding the abrasive as a slurry to a kneaded product of the solid fractions except the abrasive, subjecting the resulting mixture to primary dispersion by diluting with a solvent, and then subjecting the mixture to secondary dispersion at a higher peripheral speed than that in the primary dispersion using a dispersion medium having a small diameter after the mixture is diluted with an additional solvent. As a result, grinding ability of the magnetic recording medium may be reduced in the range as described above by diminishing the proportion of aggregates in the abrasive. A so-called W/D (wet-on-dry) method is preferably used as the coating method in order to even the degree of protrusion from the surface of the abrasive on the coating layer of the magnetic layer by enhancing uniformity of the thickness of the coating layer on the magnetic layer.

Phthalic acid is preferably added in the magnetic layer in order to restrict the amount of the extracted fatty acid within the range as described above. Consequently, the amount of the fatty acids may be increased without changing the amount of addition of the fatty acids, and durability of the magnetic recording medium may be improved.

Japanese Unexamined Patent Application Publication No. 11-86265 discloses a technique for measuring grinding ability of the magnetic recording medium using the sendust bar, wherein the surface roughness of the magnetic tape is improved in order to improve the regeneration output while permitting the magnetic recording medium to have a surface hardness so that the amount of abrasion of sendust is within a specified range in order to avoid clogging of the magnetic tape. With respect to grinding ability, the patent publication described that the grinding effect is so insufficient that the magnetic tape is clogged when the amount of grinding is less than 15 µm, while the grinding effect is too large that the magnetic head is excessively worn when the amount of grinding exceeds 35 µm. However, since abrasion is investigated with respect to the inductive head, and nothing is described with respect to the MR head of the invention that is more susceptible to damages than the inductive head.

DESCRIPTION OF THE PREFERRED EMBODIMENTS

The embodiments of the invention will be described in detail with reference to the drawings.

The magnetic recording medium of the invention is able to be favorably used in the magnetic recording system using the MR head as the reproduction head by harmonizing a requirement of reduction of damages on the MR head with a requirement of guarantee of the magnetic recording medium's own durability.

Figure 1:
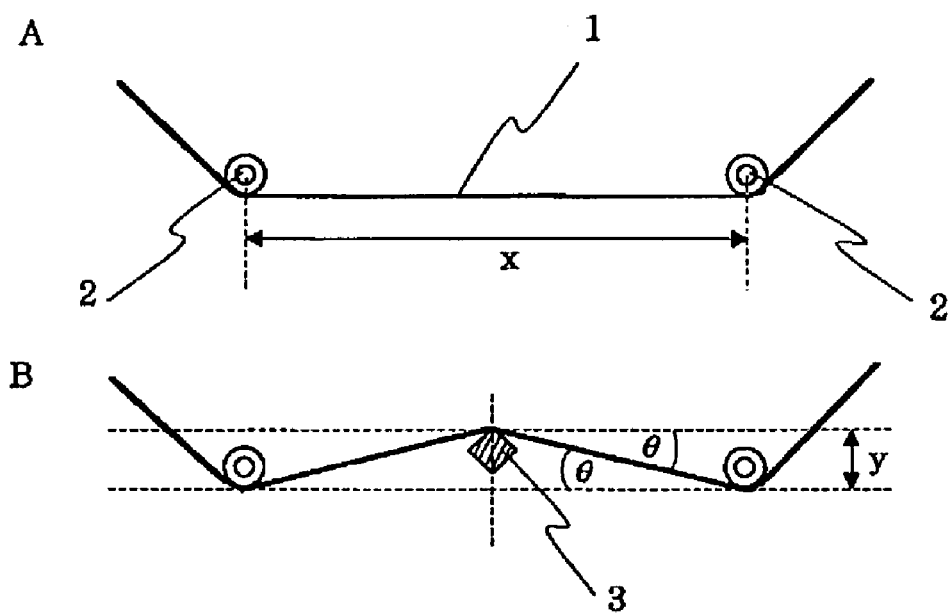
FIG. 1 illustrates the method for measuring the amount of abrasion according to the invention.

The magnetic tape 1 as the magnetic recording medium of the invention is supported at the middle between the guide rolls 2 as shown in FIG. 1A, and grinding ability of the magnetic tape 1 is defined by the amount of abrasion of the sendust bar when the magnetic tape 1 is made to perform reciprocating movement while the sendust bar 3 is pushing the midpoint between the guide rolls as shown in FIG. 1B.

Actually, two guide rolls 2 are disposed with a center-to-center distance x of 45 mm, and the magnetic tape 1 is supported between these guide rolls 2 by applying a tension of $8.8\times10^{-1}$ N/cm (90 g/cm). The sendust bar is a rectangular column having a square cross section, the edge in the longitudinal direction thereof is elongated in the direction of width of the magnetic tape 1, and the edge pushes the magnetic tape 1 with a displacement y of 2 mm in the direction perpendicular to the running direction of the magnetic tape 1. The angle of elevation of the magnetic tape θ is 5.08°. While the magnetic tape 1 comprises at least a nonmagnetic layer and magnetic layer sequentially laminated on one face of a nonmagnetic supporting member, the side being pushed by the sendust bar 3, or the lower face side in the drawing, is made to be the magnetic layer forming side, since grinding ability of the side of the magnetic tape in sliding contact with the MR head is the subject matter of the invention.

Figure 2:
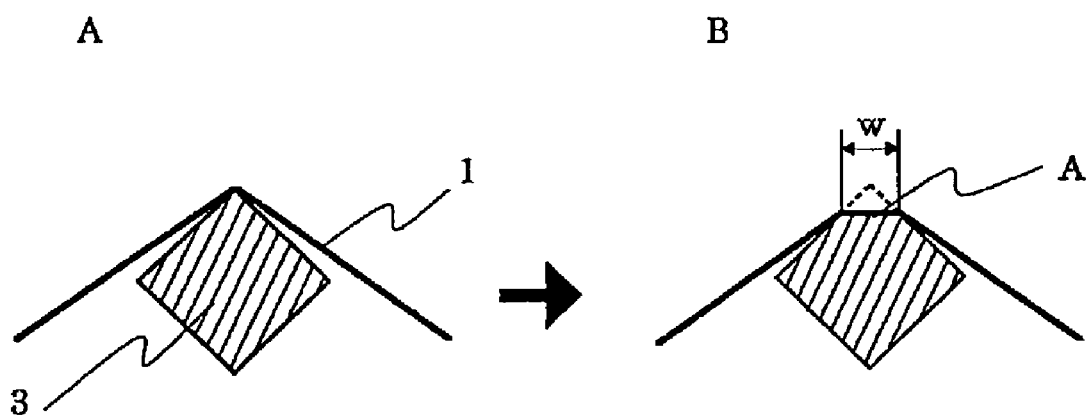
FIG. 2 is a cross section showing the worn sendust bar.

The amount of abrasion of the sendust bar 3 is defined as the width w in the running direction of the face A formed after grinding as shown in FIG. 2B starting form the state shown in FIG. 2A. The width w of the face A at the edge of the sendust bar formed by abrasion of the sendust bar in the running direction of the recording medium is 9 to 25 µm, preferably 9 to 22 µm, after 200 times of reciprocating movement at a running speed of 2.5 m/s with a total running length of the magnetic tape 1 of 250 m. The amounts of abrasion of exceeding 25 µm and less than 9 µm are not preferable, since the MR head is liable to be damaged in the former case while durability and self cleaning power of the magnetic recording medium itself becomes insufficient in the latter case.

While actual constructions of the magnetic recording medium are described in detail hereinafter, the materials, constructions and coating methods thereof are not restricted by the descriptions below so long as the amount of abrasion satisfies the conditions above in the invention.

The magnetic layer principally comprises a ferromagnetic powder and binder resin, and is formed on the nonmagnetic layer provided on the nonmagnetic supporting member. It is necessary in the magnetic recording medium of the invention that the grinding ability of the magnetic recording medium is lower than the conventional magnetic tape in order to produce a magnetic tape having grinding ability satisfying the conditions described above.

For reducing grinding ability, dispersion of the abrasive is facilitated by adding a previously dispersed slurry of the abrasive into a kneaded product containing the ferromagnetic powder and binder resin, followed by diluting the mixture with a solvent. The diluted mixture having a low viscosity is dispersed again at a high peripheral speed (8 to 20 m/s) using ceramic beads having a small particle diameter (a diameter of about 0.5 mm or less) in order to reduce the amount of aggregates of the abrasive to be as small as possible, thereby enabling the grinding ability to be lowered. Since the ferromagnetic powder is also dispersed by the treatment above, the ferromagnetic powder's own grinding ability may be also reduced. The dispersion process is maintained for 20 to 40 minutes, which is longer than the dispersion span in the conventional dispersion process. While the amount of the abrasive may be reduced for lowering the grinding ability, the strength of the coating layer of the magnetic layer is reduced when the grinding ability is adjusted within the range of the invention by this method, and durability of the magnetic tape itself is deteriorated. The method of the invention is advantageous since the magnetic tape maintains sufficient durability while reducing the grinding ability of the magnetic tape.

When the thickness of the coating layer of the magnetic layer is uneven, the abrasive is largely protruded out of the surface of the coating layer to increase the grinding ability at the thinner portions of the layer, while the grinding ability and durability to damages are reduced at the thicker portions of the layer since the abrasive is embedded in the coating layer rather than existing on the surface. Accordingly, it is important to allow the abrasive to uniformly appear on the surface of the coating layer of the magnetic layer by improving uniformity of the thickness of the coating layer. Therefore, the layer is preferably coated by a W/D (wet-on-dry) method by which the upper layer is coated on the nonmagnetic layer as the lower layer of the laminate after drying the lower layer.

It is also favorable to reduce friction between the magnetic recording medium and MR head by adjusting the amount of lubricants on the surface of the magnetic recording medium, or on the surface of the magnetic layer. Adjusting the amount of the lubricant permits the MR head to be protected from being damaged while maintaining durability of the tape. For example, the amount of extracted fatty acids as the lubricant, which is extracted in cyclohexane when the magnetic recording medium is immersed in cyclohexane for 2 minutes, is preferably 0.1 to 4.0 mg, more preferably 0.5 to 3.5 mg, per 1 m$^2$ of the surface area of the magnetic layer. A friction to an extent not compromising the self cleaning power is obtained when the amount of the extracted fatty acids is within the preferable range above, and the MR head is also favorably protected from being damaged.

For restricting the amount of the extracted fatty acids within the range described above, phthalic acid is added, for example, as an additive in the magnetic layer. Phthalic acid is readily adsorbed on pigments due to its smaller molecular weight than stearic acid as one of the fatty acids. On the other hand, since phthalic acid has a structure in which two carboxyl groups are projecting out of the benzene ring in two different directions, one carboxylic group is adsorbed on the pigment, when the other carboxyl group is projected out on the other side. Accordingly, adsorption of the fatty acids on the pigment is inhibited by a steric hindrance of phthalic acid. This means that increasing the amount of addition of phthalic acid in the magnetic layer permits free fatty acids in the coating layer to appear on the surface without increasing the amount of addition of the fatty acids. Consequently, sufficient durability may be maintained by increasing the amount of the fatty acids on the surface even in the magnetic recording medium having reduced grinding ability.

The ferromagnetic powder used in the magnetic layer is a needle-like powder of a ferromagnetic metal having a mean major axis length of preferably 0.15 µm or less, more preferably 0.05 to 0.10 µm. Electromagnetic conversion characteristics (particularly S/N and C/N characteristics) tend to be insufficiently satisfied when the mean major axis length exceeds 0.15 µm. A powder of iron oxide belonging to the hexagonal crystal system such as barium ferrite may be also used. The aspect ratio of the hexagonal iron oxide powder is preferably 2 to 7. The mean primary plate diameter as determined by a TEM observation is preferably 10 to 50 nm, since surface property of the magnetic layer tends to be deteriorated when the plate diameter is larger.

The content of such ferromagnetic powder may be 65 to 90% by weight in the composition of the magnetic layer. Surface roughness after a calender processing may be deteriorated due to the reduced content of the binder when the content of the ferromagnetic powder is too large, while a high reproduction output may be hardly obtained when the content is too small.

Favorably used binder resins for the magnetic layer include thermoplastic resins, heat-set resins and radiation curable resins, or a mixture thereof, and they are not particularly restricted.

The content of the binder resin to be used in the magnetic layer is 5 to 40 parts by weight, particularly 10 to 30 parts by weight, relative to 100 parts by weight of the ferromagnetic powder. Running durability is deteriorated due to the reduced strength of the magnetic layer when the content of the binder resin is too small, while electromagnetic conversion characteristics are deteriorated due to the decreased content of the ferromagnetic metal powder when the content is too large.

Examples of cross-linking agents for curing the binder resin include various polyisocyanates known in the art for the heat-set resin, and the content of the cross-linking agent is preferably 10 to 30 parts by weight relative to 100 parts by weight of the binder resin. An abrasive, a dispersing agent such as a detergent, higher fatty acids and other additives may be added, if necessary, in the magnetic layer. The abrasive is favorably used as a slurry of the abrasive as described above.

The paint for forming the magnetic layer is prepared by adding an organic solvent to the components above. The solvent use is not particularly restricted, and one or at least two kinds of the solvents such as ketones including methylethyl ketone (MEK), methylisobutyl ketone and cyclohexanone, and aromatic solvents such as toluene may be appropriately selected for use. The amount of addition of the organic solvent is 100 to 1100 parts by weight relative to 100 parts by weight of the combined amount of the solid fraction (ferromagnetic metal powder and various inorganic particles) and binder resin.

The thickness of the magnetic layer of the invention is 0.50 µm or less, preferably 0.01 to 0.50 µm, and more preferably 0.02 to 0.30 µm. Too large thickness of the magnetic layer increases self-demagnetization loss and thickness loss.

The nonmagnetic supporting member may be appropriately selected from resin films known in the art such as polyester, polyamide and aromatic polyamide films, or laminated films thereof, and the thickness of the film is not particularly restricted so long as it is within a range known in the art.

The nonmagnetic layer mainly comprises the nonmagnetic powder and binder resin, and is provided on the nonmagnetic supporting member. The nonmagnetic powder available for the nonmagnetic layer includes various inorganic powders preferably including needle-like nonmagnetic powders such as needle-like nonmagnetic iron oxide ($\alpha$—$Fe_2O_3$). Other nonmagnetic powders such as calcium carbonate ($CaCO_3$), titanium oxide ($TiO_2$), barium sulfate ($BaSO_4$) and $\alpha$—alumina ($Al_2O_3$) may be appropriately blended. Carbon black is preferably used for the nonmagnetic layer. Such carbon black available include furnace black for rubbers, thermal black for rubbers, coloring black and acetylene black.

The blending ratio between carbon black and inorganic powder is preferably 100/0 to 10/90 in weight ratio. Some problems may be caused with respect to surface electrical resistance when the blending ratio of the inorganic powder exceeds 90.

The thermoplastic resins, heat-set resins and radiation curable resins, or a mixture thereof, may be appropriately used for the binder resin for the nonmagnetic layer as in the magnetic layer, and they are not particularly restricted. When an EB (electron beam) curable resin is used for the binder resin, it is preferable to control the dosage of EB for curing the coating layer, in order to suppress stiffness of the magnetic tape for soft touch of the tape on the MR head and in order to further improve abrasion preventive effect of the MR head.

A dispersing agent such as a detergent, and other additives may be added, if desired, in the nonmagnetic layer. The paint for the nonmagnetic layer may be prepared using the same organic solvent with the same amount of addition as preparing the paint for the magnetic layer.

The thickness of the nonmagnetic layer is preferably 2.5 µm or less, more preferably 0.1 to 2.3 µm. Improvement of performance is not expected by increasing the thickness to be larger than 2.5 µm. Instead, the thickness becomes uneven by providing the coating layer, making the coating conditions severe with poor surface roughness.

A back coat layer is provided, if necessary, on the nonmagnetic layer of the nonmagnetic supporting layer and on the opposed side face of the face having the magnetic layer for improving running stability and for preventing electrification. The back coat layer preferably contains 30 to 80% by weight of carbon black which is conventionally used and which is the same kind of carbon back as used in the nonmagnetic layer. The nonmagnetic inorganic powder such as various kinds of abrasives used in the magnetic layer, a dispersing agent such as a detergent, lubricants such as higher fatty acids, fatty acid esters and silicone oil, and various other additives may be added, if necessary, in addition to carbon black.

The thickness of the back coat layer (after calender processing) is 0.1 to 1.0 µm, preferably 0.2 to 0.8 µm. Running stability tends to be decreased due to too large friction between the tape and the magnetic recording medium slide contact passageway when the thickness exceeds 1.0 µm. When the thickness is less than 0.1 µm, on the other hand, the coating layer of the back coat layer tends to be shaved during the magnetic recording medium is running.

As hitherto described, the invention provides a high performance magnetic recording medium used in the magnetic recording system using the MR head for the regeneration head, wherein the magnetic recording medium does not damage the MR head by direct sliding contact while having durability and self-cleaning power enough for preventing abrasion of the magnetic recording medium itself.

EXAMPLES

The following examples are given for the purpose of illustration of this invention and are not intended as limitations thereof.

Example 1

| <Paint 1 for nonmagnetic layer> | |
|---|---|
| α-$Fe_2O_3$ (DB-65 made by Toda Kogyo Co.) (mean major axis length = 0.11 µm, mean minor axis length = 18 nm, BET specific surface area = 51 $m^2/g$) | 80 parts by weight |
| Carbon black (#850 made by Mitsubishi Chemical Co.) (mean particle diameter = 16 nm, BET specific surface area = 200 $m^2/g$, DBP oil absorption = 70 ml/100 g) | 20 parts by weight |
| α-$Al_2O_3$ (HIT 60A made by Sumitomo Chemical Co.) (mean particle diameter = 0.18 µm, BET specific surface area = 12 $m^2/g$) | 5 parts by weight |
| Electron beam (EB) curable polyvinyl chloride copolymer (degree of polymerization = 300, polar group: —$OSO_3K$ = 1.5 groups/molecule) | 14 parts by weight |
| EB curable polyurethane (Mn = 26,000, polar group: —$OSO_3Na$ = 1 group/molecule) | 6 parts by weight |
| Phthalic acid | 2 parts by weight |
| methylethyl ketone (MEK) | 100 parts by weight |
| Toluene | 100 parts by weight |
| Cyclohexanone | 50 parts by weight |

After kneading the above composition, the kneaded product was dispersed using a horizontal pin-mill filled with 75% by volume of zirconia beads with a diameter of 0.8 mm at a peripheral speed of 6 m/s and a residence time of 100 minutes. The viscosity of the paint during dispersion was 5,000 cps.

Then, the viscosity was adjusted to 500 cps by adding the following additives and solvents, and the mixture was dispersed at a peripheral speed of 6 m/s and residence time of 20 minutes and using a horizontal pin-mill filled with 75% by volume of zirconia beads with a diameter of 0.8 mm to prepare the paint 1 for the nonmagnetic layer.

| | |
|---|---|
| Butyl stearate | 1 part by weight |
| Stearic acid | 1 part by weight |
| MEK | 40 parts by weight |
| Toluene | 40 parts by weight |
| Cyclohexanone | 20 parts by weight |

<Paint 1 for magnetic layer>

| | |
|---|---|
| Magnetic metal powder<br>(Hc = 148.9 A/m (1,885 Oe), σs = 138 Am$^2$/kg (emu/g), BET specific surface area = 58 m$^2$/g, mean major axis length = 0.10 μm) | 100 parts by weight |
| Polyvinyl chloride copolymer (MR110 made by Nihon Zeon Co.)<br>(degree of polymerization = 300, polar group —OSO$_2$K = 1.5 groups/molecule) | 10 parts by weight |
| Polyurethane resin containing —SO$_3$Na<br>(Mn = 25,000, polar group concentration = 1 group/molecule) | 7 parts by weight |
| Slurry of abrasive (SLH 182B made by Sumitomo Chemical Co.)<br>(HIT82 (mean particle diameter = 0.12 μm) 44.6%, polyurethane resin 7.2%) | 22 parts by weight |
| Slurry of abrasive (SLH 160B made by Sumitomo Chemical Co.)<br>(HIT60 (mean particle diameter = 0.18 μm) 46.8%, polyurethane resin 7.2%) | 11 parts by weight |
| Myristic acid | 2 parts by weight |
| MEK | 90 parts by weight |
| Toluene | 90 parts by weight |
| Cyclohexanone | 120 parts by weight |

After kneading the composition above except the slurries of the abrasive and a part of the solvents, the slurries of the abrasive were added. The mixture was diluted with the remaining solvents, and was dispersed using a horizontal pin-mill filled with 75% by volume of zirconia beads with a diameter of 0.8 mm at a peripheral speed of 6 m/s and a residence time of 80 minutes. The viscosity of the paint during dispersion was 5,000 cps.

Subsequently, the viscosity was adjusted to 500 cps by adding the following additives and solvents, and the mixture was dispersed using a horizontal pin-mill filled with 75% by volume of zirconia beads with a diameter of 0.5 mm at a peripheral speed of 10 m/s and a residence time of 30 minutes to prepare the paint 1 for the magnetic layer.

| | |
|---|---|
| Butyl stearate | 1 part by weight |
| Stearic acid | 1 part by weight |
| MEK | 110 parts by weight |
| Toluene | 110 parts by weight |
| Cyclohexanone | 160 parts by weight |

<Paint for back coat layer>

| | |
|---|---|
| Carbon black<br>(BP-800 made by Showa Cabot Co., mean particle diameter = 17 nm) | 75 parts by weight |
| Carbon black<br>(BP-800 made by Showa Cabot Co., mean particle diameter = 75 nm) | 10 parts by weight |
| Barium sulfate<br>(mean particle diameter = 30 nm) | 10 parts by weight |
| Nitrocellulose<br>(BTH 1/2 made by Asahi Kasei Co.) | 55 parts by weight |
| Polyurethane<br>(UR-8300 made by Toyobo Co.)<br>NV 12%<br>Solvent ratio: MEK/toluene/cycloyhexane = 53/40/7 | 35 parts by weight |

The composition was kneaded followed by dispersion with a sand grind mill. The paint for the back coat layer was prepared by finally adjusting the viscosity.

The composition was coated on a polyethylene naphthalate (PEN) film with a thickness of 6.2 μm by an extrusion die nozzle method so that the dry thickness of the paint 1 for the nonmagnetic layer becomes 2.0 μm. The film was dried at a drying temperature of 100° C. followed by a calender processing at a temperature of 100° C. and linear pressure of 2,940 N/cm (300 kg/cm). A raw sheet of the nonmagnetic layer was manufactured after finally irradiating with an electron beam (4.2 Mrad). Then, 4 parts by weight of Collonate C-3041 (made by Nihon Polyurethane Co.) as a curing agent was added to the paint 1 for the magnetic layer, which was coated on the raw sheet of the nonmagnetic layer by the extrusion die nozzle method so that the dry thickness becomes 0.15 μm followed by orientation treatment. After drying the coating layer at a drying temperature of 110° C., the sheet was subjected to a calender treatment at a temperature of 100° C. and linear-pressure of 2,940 N/cm (300 kg/cm). Added to the paint for the back coat layer was 18 parts by weight of the curing agent Collonate C-3041 (made by Nihon Polyurethane Co.), and the paint for the back coat layer was coated on the base film face at the side opposed to the magnetic layer by the extrusion die nozzle method so that the dry thickness becomes 0.5 μm followed by the calender treatment at a liner pressure of 2,940 N/cm (300 kg/cm) at 90° C. after drying at 110° C., thereby manufacturing the raw sheet roll.

After allowing the raw sheet roll to stand still for 24 hours at room temperature, the coating layer was cured by heating at 60° C. for 24 hours in an oven. The sheet was slit into tapes of ½ inch width, servo signals were written with a LTO servo writer, and the tape was assembled into a cassette to prepare a magnetic tape sample.

Example 2

A magnetic tape sample was prepared by the same method as in Example 1, except that the mixture was dispersed at a peripheral speed of 15 m/s using a horizontal pin-mill filled with 75% by volume of zirconia beads with a diameter of 0.5 mm after adjusting the viscosity at 500 cps by adding the additives and solvents in the method for preparing the paint for the magnetic layer in Example 1.

Example 3

A magnetic tape sample was prepared by the same method as in Example 1, except that the mixture was dispersed at a peripheral speed of 8 m/s using a horizontal pin-mill filled with 75% by volume of zirconia beads with a diameter of 0.5 mm after adjusting the viscosity at 500 cps by adding the additives and solvents in the method for preparing the paint for the magnetic layer in Example 1.

Example 4

A magnetic tape sample was prepared by the same method as in Example 1, except that the amount of addition of phthalic acid in Example 1 was changed to 3 parts by weight, and the mixture was dispersed at a peripheral speed of 8 m/s using a horizontal pin-mill filled with 75% by volume of zirconia beads with a diameter of 0.5 mm after adjusting the viscosity at 500 cps by adding the additives and solvents in the method for preparing the paint for the magnetic layer in Example 1.

Example 5

A magnetic tape sample was prepared by the same method as in Example 1, except that the amount of addition of phthalic acid in Example 1 was changed to 1 parts by weight, and the mixture was dispersed at a peripheral speed of 8 m/s using a horizontal pin-mill filled with 75% by volume of zirconia beads with a diameter of 0.5 mm after adjusting the viscosity at 500 cps by adding the additives and solvents in the method for preparing the paint for the magnetic layer in Example 1.

Example 6

A magnetic tape sample was prepared by the same method as in Example 1, except that the amount of addition of phthalic acid in Example 1 was changed to 2.5 parts by weight, and the mixture was dispersed at a peripheral speed of 8 m/s using a horizontal pin-mill filled with 75% by volume of zirconia beads with a diameter of 0.5 mm after adjusting the viscosity at 500 ops by adding the additives and solvents in the method for preparing the paint for the magnetic layer in Example 1.

Example 7

A magnetic tape sample was prepared by the same method as in Example 1, except that the amount of addition of phthalic acid in Example 1 was changed to 1.2 parts by weight, and the mixture was dispersed at a peripheral speed of 8 m/s using a horizontal pin-mill filled with 75% by volume of zirconia beads with a diameter of 0.5 mm after adjusting the viscosity at 500 cps by adding the additives and solvents in the method for preparing the paint for the magnetic layer in Example 1.

Example 8

A magnetic tape sample was prepared by the same method as in Example 1, except that the mixture was dispersed at a peripheral speed of 15 m/s using a horizontal pin-mill filled with 75% by volume of zirconia beads with a diameter of 0.3 mm after adjusting the viscosity at 500 cps by adding the additives and solvents in the method for preparing the paint for the magnetic layer in Example 1.

Example 9

A magnetic tape sample was prepared by the same method as in Example 1, except that the amount of addition of phthalic acid in Example 1 was changed to 3 parts by weight, and the mixture was dispersed at a peripheral speed of 15 m/s using a horizontal pin-mill filled with 75% by volume of zirconia beads with a diameter of 0.3 mm after adjusting the viscosity at 500 cps by adding the additives and solvents in the method for preparing the paint for the magnetic layer in Example 1.

Example 10

A magnetic tape sample was prepared by the same method as in Example 1, except that the amount of addition of phthalic acid in Example 1 was changed to 1 parts by weight, and the mixture was dispersed at a peripheral speed of 15 m/s using a horizontal pin-mill filled with 75% by volume of zirconia beads with a diameter of 0.3 mm after adjusting the viscosity at 500 cps by adding the additives and solvents in the method for preparing the paint for the magnetic layer in Example 1.

Example 11

A magnetic tape sample was prepared by the same method as in Example 1, except that the amount of addition of phthalic acid in Example 1 was changed to 2.5 parts by weight, and the mixture was dispersed at a peripheral speed of 15 m/s using a horizontal pin-mill filled with 75% by volume of zirconia beads with a diameter of 0.3 mm after adjusting the viscosity at 500 cps by adding the additives and solvents in the method for preparing the paint for the magnetic layer in Example 1.

Example 12

A magnetic tape sample was prepared by the same method as in Example 1, except that the amount of addition of phthalic acid in Example 1 was changed to 1.2 parts by weight, and the mixture was dispersed at a peripheral speed of 15 m/s using a horizontal pin-mill filled with 75% by volume of zirconia beads with a diameter of 0.3 mm after adjusting the viscosity at 500 cps by adding the additives and solvents in the method for preparing the paint for the magnetic layer in Example 1.

Comparative Example 1

A magnetic tape sample was manufactured by the same method as in Example 1, except that abrasive powders (HIT82, HIT60A) were used in place of the slurries of the abrasives (SLH182B and SLH160B made by Sumitomo Chemical Co.) used in the magnetic paint in Example 1, and the mixture was dispersed at a peripheral speed of 8 m/s using a horizontal pin-mill filled with 75% by volume of zirconia beads with a diameter of 0.8 mm after adjusting the viscosity at 500 cps by adding the additives and solvents.

Comparative Example 2

A magnetic tape sample was prepared by the same method as in Example 1, except that the mixture was dispersed at a peripheral speed of 8 m/s using a horizontal pin-mill filled with 75% by volume of zirconia beads with a diameter of 0.8 mm after adjusting the viscosity at 500 cps by adding the additives and solvents in the method for preparing the paint for the magnetic layer in Example 1.

Comparative Example 3

A magnetic tape sample was prepared by the same method as in Example 1, except that the mixture was dispersed at a peripheral speed of 15 m/s using a horizontal pin-mill filled with 75% by volume of zirconia beads with a diameter of 0.1 mm after adjusting the viscosity at 500 cps by adding the additives and solvents in the method for preparing the paint for the magnetic layer in Example 1.

Sample Performance Test

The magnetic tape samples obtained in the examples and comparative examples were tested with respect to the following items.

<Sendust Grinding Ability>

A rectangular column of sendust bar (sendust bar (a block of Fe-Si-Al alloy), trade name SD-5 made by Tokin Co.) having a square cross section with a size of 6.0 mm×6.0 mm×25.0 mm was placed at the middle of two guide rolls (with a center-to-center distance of 45 mm), and the edge of the sendust bar 3 in the longitudinal direction was made to push the magnetic layer forming side of the magnetic tape 1 with a displacement of 2 mm from the running level of the magnetic tape in the direction perpendicular to the running direction of the magnetic tape 1. The angle θ of elevation of the magnetic tape 1 pushed by sendust bar 3 was 5.08°. The driving tension of the magnetic tape 1 was adjusted to $8.8 \times 10^{-1}$ N/cm (90 g/cm). The width of the face at the edge of the sendust bar formed by abrasion of the sendust bar in the running direction of the recording medium was measured after 200 times of reciprocating movement with a total running length of the magnetic recording medium of 250 m. The measuring environment was 20° C. in temperature and 60% in relative humidity, and the tape speed was 2.5 m/s.

<Extraction of Fatty Acid>

A 3 m fraction the magnetic tape was immersed in 50 ml of cyclohexane for 2 minutes, and the amount of the extracted fatty acid was measured by gas chromatography. The weight of the fatty acid extracted in cyclohexane was converted into the weight per 1 $m^2$ of the magnetic layer ($mg/m^2$).

<Driving Test>

The entire track of the magnetic tape of one reel of the magnetic tape (total length 600 m) was written using a drive Ultrium 230 made by Hewlett-Packard (HP) Co. to measure the incidence of write error. Then, the entire track was read to measure the incidence of read error. Only fresh (non-use) tapes were used, and 200 reels of them were continuously run to evaluate the change of incidence of errors from the first to 200 reels. The unit of errors was defined to be the incidence of errors when 1 MB random data were written. The MR head is gradually damaged when the magnetic tape has high grinding ability, and the incidence of errors increases. The tape having a smaller incidence of errors after running 200 reels relative to the tape at the first run was evaluated as good.

Since the grinding ability of the magnetic tape is the highest when the tape is fresh and slightly decreases by running, the MR head is far more damaged by running only the fresh tapes as compared with repeatedly running the same reel of the tape. Accordingly, the drive test was carried out for evaluating the dame of the head.

<Durability>

Write and read tests of the total length (600 m) of the magnetic tape was repeated 20,000 times of pass using the drive Ultrium 230 made by Hewlett-Packard Co. The tape was evaluated by the pass number of the running test when the incidence of errors increases 5 times of the initial incidence of errors. The tape having less than 5 times of increment of the incidence of errors after 20,000 times of running pass was evaluated to be the best.

<Peeling of Powder>

The head was observed with a microscope after repeatedly running the total length of the tape for 48 hours in an environment of 40° C. in temperature and 80% in relative humidity using the drive Ultrium 230 made by Hewlett-Packard Co. The tape that substantially gives no adhesion of the powder on the head was evaluated as "very good", the tape that gives slight adhesion of the powder on the head was evaluated as "good", and the tape that gives accumulated powder on the head was evaluated as "poor".

Figure 3:
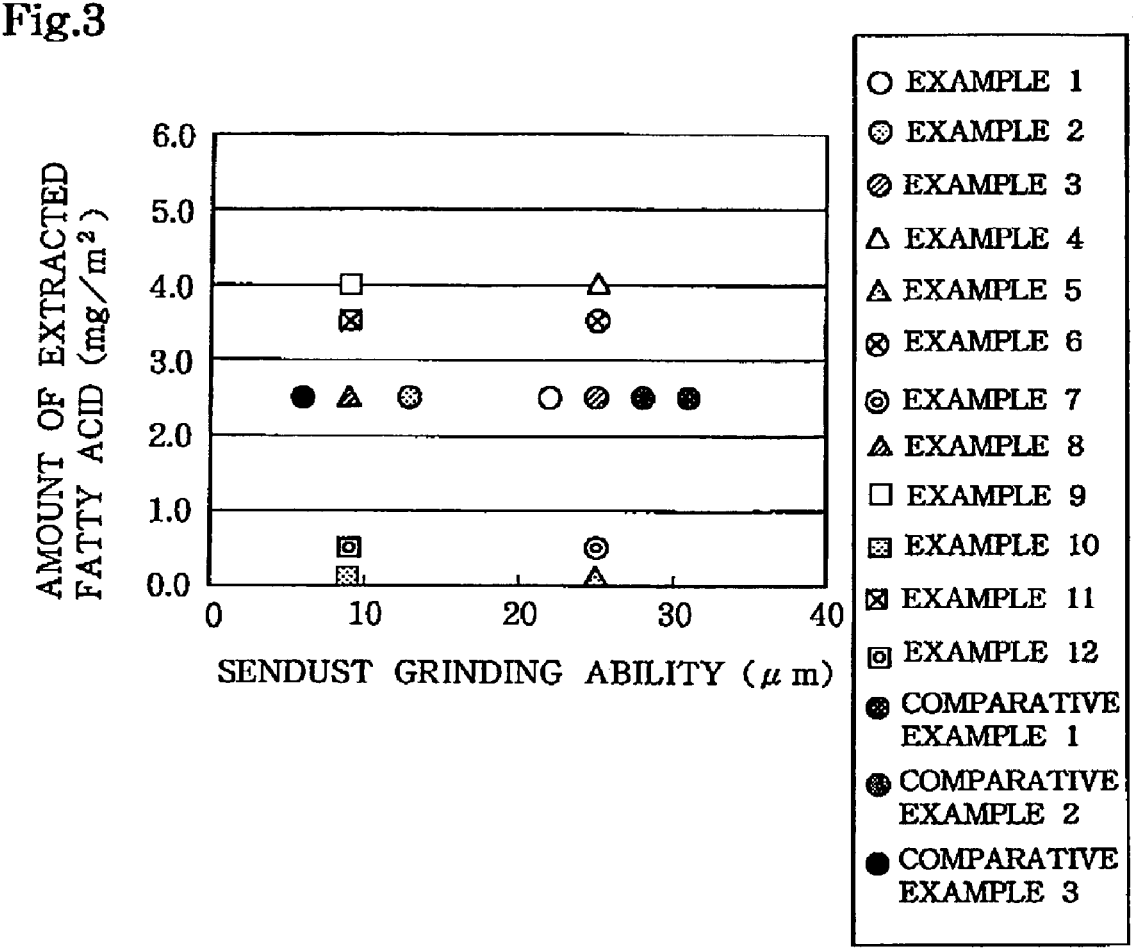
FIG. 3 is a graph showing the relation between the grinding ability and the amount of the extracted fatty acid according to Examples 1–12 and Comparative examples 1–3.

The results of evaluation by these tests are shown in Table 1, and the relation between the sendust grinding ability and the amount of the extracted fatty acid is shown in FIG. 3.

TABLE 1

| | SENDUST GRINDING ABILITY (μm) | EXTRACTED AMOUNT OF FATTY ACID (mg/m²) | DRIVE TEST | | DURABILITY | | |
|---|---|---|---|---|---|---|---|
| | | | INITIAL (ERROR/MB) | AFTER 200 REELS (ERROR/MB) | PASS (TIMES) | INCREMENT OF ERROR (TIMES) | PEELING OF POWDER |
| EXAMPLE 1 | 22 | 2.5 | 0.4 | 1.2 | 20,000 | NONE | VERY GOOD |
| EXAMPLE 2 | 13 | 2.5 | 0.3 | 1.1 | 20,000 | NONE | VERY GOOD |
| EXAMPLE 3 | 25 | 2.5 | 0.5 | 1.5 | 20,000 | NONE | VERY GOOD |
| EXAMPLE 4 | 25 | 4.0 | 0.5 | 1.6 | 20,000 | NONE | GOOD |
| EXAMPLE 5 | 25 | 0.1 | 0.5 | 1.5 | 20,000 | 19,800 | GOOD |
| EXAMPLE 6 | 25 | 3.5 | 0.5 | 1.5 | 20,000 | NONE | VERY GOOD |
| EXAMPLE 7 | 25 | 0.5 | 0.5 | 1.5 | 20,000 | NONE | VERY GOOD |
| EXAMPLE 8 | 9 | 2.5 | 0.3 | 0.8 | 20,000 | NONE | VERY GOOD |
| EXAMPLE 9 | 9 | 4.0 | 0.3 | 0.8 | 20,000 | NONE | GOOD |
| EXAMPLE 10 | 9 | 0.1 | 0.4 | 0.9 | 20,000 | 19,000 | GOOD |
| EXAMPLE 11 | 9 | 3.5 | 0.3 | 0.8 | 20,000 | NONE | VERY GOOD |
| EXAMPLE 12 | 9 | 0.5 | 0.3 | 0.8 | 20,000 | NONE | VERY GOOD |
| COMPARATIVE EXAMPLE 1 | 31 | 2.5 | 0.6 | 84 | 20,000 | 1,000 | VERY GOOD |
| COMPARATIVE EXAMPLE 2 | 28 | 2.5 | 0.5 | 27 | 20,000 | 3,000 | VERY GOOD |
| COMPARATIVE EXAMPLE 3 | 6 | 2.5 | 0.3 | 0.7 | 2,000 | 500 | POOR |

It was confirmed from Table 1 above that increment of the incidence of errors in the drive test is suppressed in the magnetic tapes in Examples 1 to 12 in which the grinding ability is controlled within the range of the invention while giving small damage to the MR head and having the magnetic tape's own high durability and self-cleaning power. The result in Comparative Example 3 shows that durability decreases when the grinding ability decreases to less than 9 μm with a large quantity of peeling of the powder (or insufficient self-cleaning power).

<Sendust Grinding Ability>

Short distance sendust grinding ability was measured with respect to the magnetic tape In Examples 3 and 8 having grinding abilities in the range of the invention by the same method as described above, except that the length of running was changed from 200 times of reciprocating movement with the running length of 250 m to 500 m of one way running. The results of measurements of the sendust grinding ability are shown in Table 2.

TABLE 2

| | SENDUST GRINDING ABILITY (μm) | |
|---|---|---|
| | SHORT DISTANCE (500 m) | 50,000 m |
| EXAMPLE 3 | 9 | 25 |
| EXAMPLE 8 | 4 | 9 |

Table 2 above shows that the amount of grinding of the magnetic tape of the invention is 9 μm at the highest under the short length measuring conditions described in Japanese Unexamined Patent Application Publication No. 11-86265, and this amount of grinding is far more smaller than the range of grinding of 15 to 35 μm of the magnetic recording medium disclosed in the patent publication above. Accordingly, the range of grinding of the invention is far more smaller than the range described in the patent publication above.

What is claimed is:

1. A magnetic recording medium used for a magnetic recording system having an MR head as a regeneration head, the recording medium comprising at least a nonmagnetic layer and magnetic layer sequentially laminated on one face of a nonmagnetic supporting member, the magnetic layer comprising at least a ferromagnetic powder, a binder resin and an abrasive, wherein the magnetic recording medium has a grinding ability such that
   when
      the magnetic recording medium is supported with a tension of $8.8 \times 10^{-1}$ N/cm per unit width between two guide rolls disposed with a center-to-center distance of 45 mm, and
      an edge in the longitudinal direction of a rectangular column of a Fe-Si-Al alloy sendust bar having a square cross section pushes a magnetic layer forming face of the magnetic recording medium at a middle point between the guide rolls in a direction perpendicular to a running direction of the magnetic recording medium with a displacement of 2 mm,
   then the width of a face at the edge of the sendust bar, formed by abrasion of the sendust bar in the running direction of the recording medium after 200 times of reciprocating movement at a running speed of 2.5 m/s with a total running length of the magnetic recording medium of 250 m, is in a range of from 9 to 25 μm.

2. The magnetic recording medium according to claim 1, wherein the amount of fatty acids extracted in cyclohexane when the magnetic recording medium is immersed in cyclohexane for 2 minutes is 0.1 to 4.0 mg/m² of the surface area of the magnetic layer.

3. The magnetic recording medium according to claim 1, wherein the magnetic layer is formed by coating a magnetic paint comprising at least a ferromagnetic powder, a binder resin and an abrasive on the nonmagnetic supporting member as solid fractions, the magnetic paint being dispersed with the use of ceramic beads having a diameter of about 0.5 mm or less.

4. The magnetic recording medium according to claim 3, wherein the magnetic paint is dispersed at a peripheral speed of 8 to 20 m/s.

5. The magnetic recording medium according to claim 1, wherein the magnetic layer is formed by coating a magnetic paint comprising at least a ferromagnetic powder, a binder resin and an abrasive on the nonmagnetic supporting member as solid fractions, a step for producing the magnetic paint comprising adding the abrasive as a slurry to a kneaded product of the solid fractions except the abrasive, subjecting the resulting mixture to primary dispersion, followed by diluting the mixture with a solvent, and then subjecting the mixture to secondary dispersion at a higher peripheral speed than that in the primary dispersion using a dispersion medium having a small diameter after the mixture is diluted with an additional solvent.

6. The magnetic recording medium according to claim 1, wherein the magnetic layer comprises a fatty acid-containing lubricant and phthalic acid.

* * * * *